(12) United States Patent
Lee (10) Patent No.: US 11,587,207 B2
(45) Date of Patent: Feb. 21, 2023

(54) IMAGE DEBANDING METHOD (71) Applicant: REALTEK SEMICONDUCTOR CORP., Hsinchu (TW)

(72) Inventor: Kung-Ho Lee, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 261 days.

(21) Appl. No.: 17/129,382

(22) Filed: Dec. 21, 2020

(65) Prior Publication Data
US 2021/0350505 A1 Nov. 11, 2021

(30) Foreign Application Priority Data

May 5, 2020 (TW) .................................. 109114948

(51) Int. Cl.
G06T 5/00 (2006.01)
G06T 7/90 (2017.01)
(52) U.S. Cl.
CPC ................ G06T 5/002 (2013.01); G06T 7/90 (2017.01); G06T 2207/10024 (2013.01)
(58) Field of Classification Search
CPC .. G06T 5/002; G06T 7/90; G06T 2207/10024
See application file for complete search history.

(56) References Cited

U.S. PATENT DOCUMENTS 5,881,182 A * 3/1999 Fiete ........................ G06T 5/20
358/463
7,289,127 B1 * 10/2007 Zimmer .................. G06T 15/80
345/428

(Continued)

FOREIGN PATENT DOCUMENTS

CN 102413271 A * 4/2012
CN 109155845 A * 1/2019 ............... H04N 1/41

(Continued)

OTHER PUBLICATIONS

Bhagavathy et al. ("Multi-Scale Probabilistic Dithering for Suppressing Banding Artifacts in Digital Images," IEEE International Conference on Image Processing; Date of Conference: Sep. 16, 2007-Oct. 19, 2007) (Year: 2007).*

(Continued)

Primary Examiner — Yubin Hung
(74) Attorney, Agent, or Firm — Birch, Stewart, Kolasch & Birch, LLP (57) ABSTRACT

An image debanding method includes selecting a first and a second comparison pixel from a plurality of adjacent pixels within a preset pixel distance range in a straight pixel direction according to each of the plurality of adjacent pixels and the to-be-compensated pixel; calculating a first compensation value according to a first difference between pre-debanding color values of the first comparison pixel and the to-be-compensated pixel, a first pixel distance between the first comparison pixel and the to-be-compensated pixel, and the preset pixel distance range; calculating a second compensation value according to a second difference between the pre-debanding color values of the second comparison pixel and the to-be-compensated pixel, a second pixel distance between the second comparison pixel and the to-be-compensated pixel, and the preset pixel distance range; and calculating a post-debanding color component value of the to-be-compensated pixel.

20 Claims, 7 Drawing Sheets

(56) References Cited

U.S. PATENT DOCUMENTS

| | | | |
|---|---|---|---|
| 2006/0233456 A1* | 10/2006 | Ahn | G06T 5/20 |
| | | | 382/275 |
| 2015/0117793 A1* | 4/2015 | Deng | G06T 5/002 |
| | | | 382/261 |
| 2016/0125579 A1* | 5/2016 | Song | G06T 5/008 |
| | | | 382/261 |
| 2016/0307298 A1* | 10/2016 | Chou | G06T 5/001 |
| 2017/0208345 A1* | 7/2017 | Jeong | H04N 19/70 |

FOREIGN PATENT DOCUMENTS

| | | | |
|---|---|---|---|
| TW | 411706 B | 11/2000 | |
| WO | WO-9955078 A1 * | 10/1999 | H04N 21/4318 |

OTHER PUBLICATIONS

Lee et al. ("Two-stage false contour detection using directional contrast and its application to adaptive false contour reduction," IEEE Transactions on Consumer Electronics; vol. 52, Issue: 1, Feb. 2006) (Year: 2006).*

Xu et al. ("A simple and effective algorithm for false contour reduction in digital television," Digest of Technical Papers International Conference on Consumer Electronics; Date of Conference: Jan. 9-13, 2010) (Year: 2010).*

* cited by examiner

IMAGE DEBANDING METHOD

CROSS-REFERENCE TO RELATED APPLICATION

This non-provisional application claims priority under 35 U.S.C. § 119(a) to patent application Ser. No. 109114948 in Taiwan, R.O.C. on May 5, 2020, the entire contents of which are hereby incorporated by reference.

BACKGROUND

Technical Field

The present invention relates to an image debanding method.

Related Art

In a conventional image processing technology, in order to produce a low-capacity image, some color details are often omitted in quantization and encoding programs of image processing, or the image is compressed to produce a low-capacity image. However, due to the reduction of some color details, a color band is often generated on the low-capacity image, that is, the image has an abnormal color gamut boundary. Therefore, the color band of the image needs to be eliminated to improve image definition. In a conventional color band elimination technology, if debanding is to be performed on one of pixels, pixels of the entire image need to be calculated, so that debanding on one of the pixels may be performed. In this way, a considerable amount of calculation is generated, excessively long calculation time is caused, and excessively calculation resources are consumed. In addition, the considerable large amount of calculation also increases hardware complexity of the debanding, that is, production costs cannot be reduced.

SUMMARY

In some embodiments, an image debanding method includes selecting a first comparison pixel and a second comparison pixel from a plurality of first adjacent pixels being, within a preset pixel distance range from the to-be-compensated pixel, along a first straight pixel direction passing through the to-be-compensated pixel of an image signal; calculating a first compensation value and a second compensation value; and calculating a post-debanding color component value. The first comparison pixel and the second comparison pixel are, respectively, located in a first and a second side direction with respect to a to-be-compensated pixel. The first comparison pixel and the second comparison pixel are selected according to a pre-debanding color value corresponding to a color component of each of the plurality of first adjacent pixels and a pre-debanding color value corresponding to the color component of the to-be-compensated pixel. The first compensation value is calculated according to a first difference between the pre-debanding color value of the first comparison pixel and the pre-debanding color value of the to-be-compensated pixel, a first pixel distance between the first comparison pixel and the to-be-compensated pixel, and the preset pixel distance range. The second compensation value is calculated according to a second difference between a pre-debanding color value of the second comparison pixel and the pre-debanding color value of the to-be-compensated pixel, a second pixel distance between the second comparison pixel and the to-be-compensated pixel, and the preset pixel distance range. The post-debanding color component value of the color component of the to-be-compensated pixel is calculated according to the first compensation value, the second compensation value, and a first random number.

DETAILED DESCRIPTION

Figure 1:
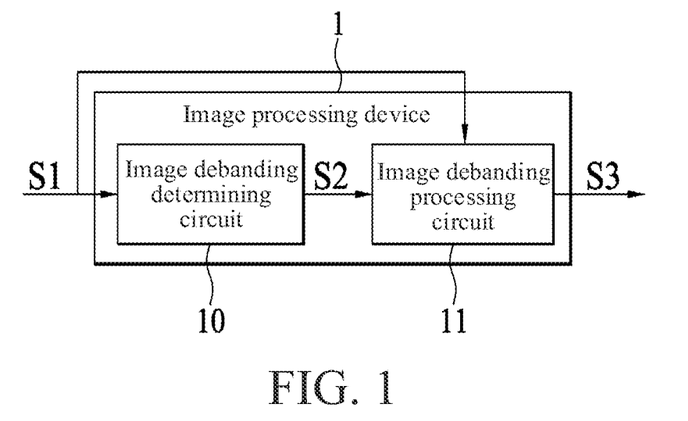
FIG. 1 is a circuit block diagram according to an embodiment of an image processing device applying an image debanding processing circuit according to the present invention.

FIG. 1 is a circuit block diagram according to an embodiment of an image processing device 1 applying an image debanding processing circuit 11 of the present invention. Referring to FIG. 1, the image processing device 1 includes an image debanding determining circuit 10 and an image debanding processing circuit 11 coupled to the image debanding determining circuit 10. The image debanding determining circuit 10 may receive an input image signal S1, and determine whether a plurality of pixels of the input image signal S1 is debanding-required to generate a determining result S2. If the determining result S2 indicates that any pixel of the input image signal S1 may require to be debanded, the image debanding processing circuit 11 performs the debanding on said pixels. In some embodiments, if the image debanding determining circuit 10 determines that a distance between some pixels of the input image signal S1 and an image boundary is less than a preset distance, a determining result S2 shows NO. If the image debanding determining circuit 10 determines that the distance between some pixels of the input image signal S1 and the image boundary is greater than the preset distance, the determining result S2 shows YES, but the present invention is not limited thereto.

Figure 2:
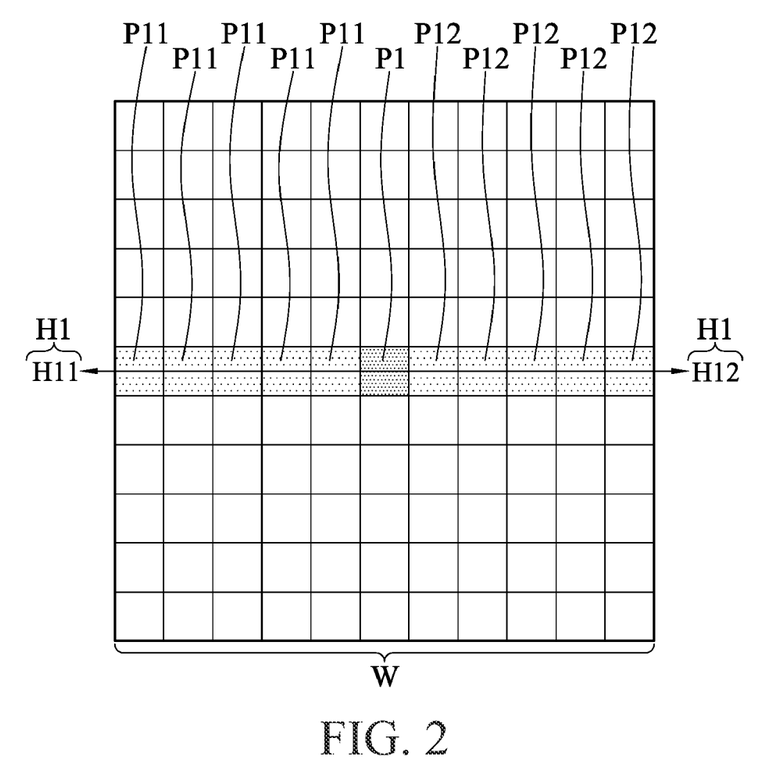
FIG. 2 is a schematic diagram according to an embodiment of an image debanding method by which the image debanding processing circuit in FIG. 1 performs.

FIG. 2 is a schematic diagram according to an embodiment of an image debanding method by which the image debanding processing circuit 11 performs. As shown in FIG. 2, an image block of the input image signal S1 includes a plurality of pixels. One of the pixels P1 and a plurality of adjacent pixels P11, P12 are horizontally arranged in line along a straight direction H1 (hereinafter referred to as a first straight pixel direction H1). The plurality of adjacent pixels P11, P12 (hereinafter referred to as first adjacent pixels P11, P12) are pixels centred on the pixel P1 in a predetermined pixel distance along the straight direction H1. [W] in an example of FIG. 2 represents the preset pixel distance range. In addition, in the straight direction H1 relative to both sides of the pixel P1, the straight direction H1 of the first pixel includes a first side direction H11 and a second side direction H12. The first side direction H11 is the direction passing through the first adjacent pixel P11 within the preset pixel distance range. The second side direction H12 is the direction passing through the first adjacent pixel P12 within the preset pixel distance range.

Figure 3:
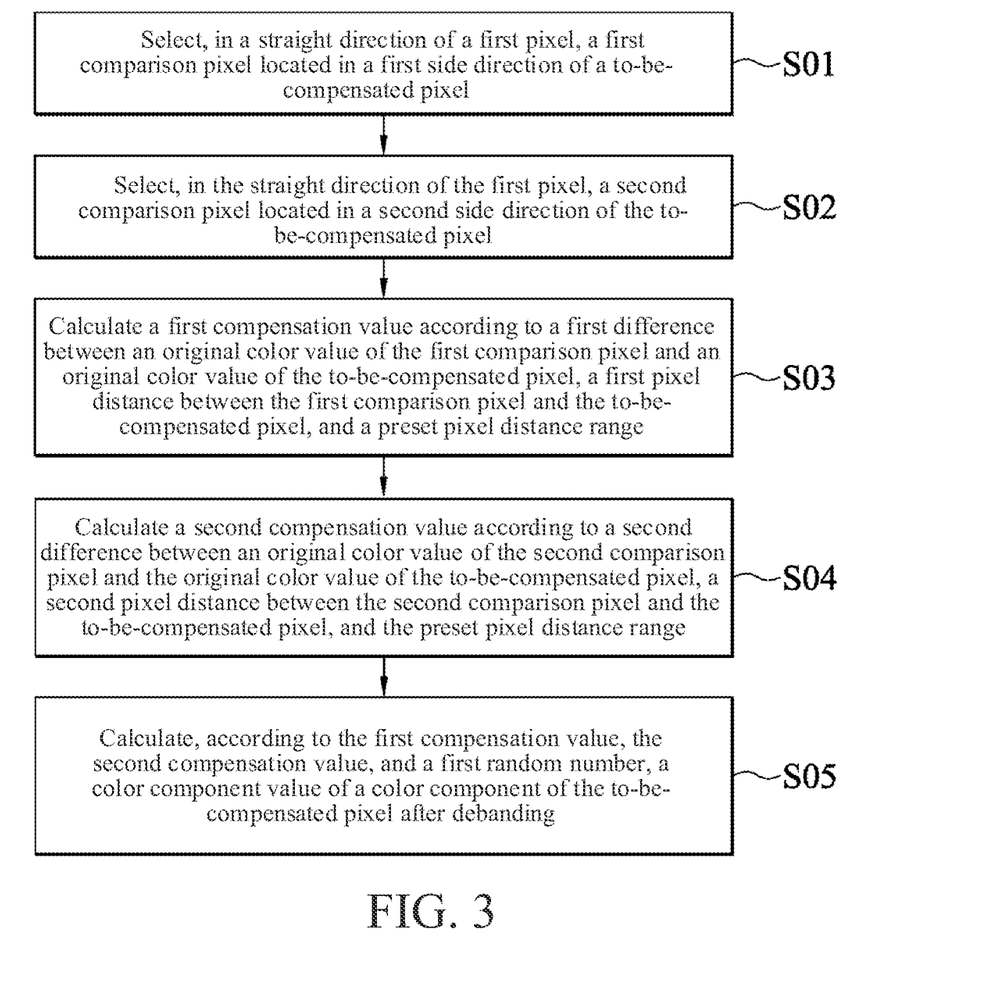
FIG. 3 is a flowchart according to an embodiment of an image debanding method of the present invention.

For example, with respect to a first color component of a color component, referring to FIG. 1 to FIG. 3, when the image debanding determining circuit 10 determines that the first color component of the pixel P1 (hereinafter referred to as a to-be-compensated pixel P1) may require debanding, along the first side direction H11, the image debanding processing circuit 11 selects a first comparison pixel, one of a plurality of the first adjacent pixels P11, according to an original color value (a value before debanding, or called as pre-debanding color value) of a first color component of the to-be-compensated pixel P1 and an original color value (a value before debanding) of the first color component of the first adjacent pixel P11 (step S01). In addition, along the second side direction H12, the image debanding processing circuit 11 selects a second comparison pixel, one of a plurality of the first adjacent pixels P12, according to an original color value (a value before debanding) of a first color component of the to-be-compensated pixel P1 and an original color value (a value before debanding) of the first color component of the first adjacent pixel P12 (step S02).

In some embodiments, the first color component may be brightness (Y), blue chroma (Cb), red chroma (Cr), red (R), green (G), or blue (B).

In some embodiments, in step S01, the image debanding processing circuit 11 may calculate a difference between the original color value of the to-be-compensated pixel P1 and each of the first adjacent pixels P11 along the first side direction H11, and determine whether the difference is smaller than a preset difference (the preset difference is not zero). When the difference between the original color value of each of the plurality of first adjacent pixels P11 and the original color value the to-be-compensated pixel P1 is less than the preset difference, the image debanding processing circuit 11 selects, as a first comparison pixel, one of plurality of first adjacent pixels P11 whose distance from the to-be-compensated pixel P1 is the maximum (for example, the first adjacent pixel P11 that is three pixels away from the to-be-compensated pixel). A pixel distance between the first comparison pixel and the to-be-compensated pixel P1 is referred to as a first pixel distance in the following.

In addition, in step S02, the image debanding processing circuit 11 may calculate a difference between an original color value of the first color component of the to-be-compensated pixel P1 and an original color value of each of the first adjacent pixels P12 in the second side direction H12, and determine whether the difference is less than the foregoing preset difference. When the difference between the original color value of each of the plurality of first adjacent pixels P12 and original color value of the to-be-compensated pixel P1 is less than the preset difference, the image debanding processing circuit 11 selects, as a second comparison pixel, one of plurality of first adjacent pixels P12 whose distance from the to-be-compensated pixel P1 is the maximum (for example, the first adjacent pixel P12 that is two pixels away from to-be-compensated pixel). A pixel distance between the second comparison pixel and the to-be-compensated pixel P1 is referred to as a second pixel distance in the following. In short, the first comparison pixel and the second comparison pixel are selected according to pre-debanding color value corresponding to a color component of each of the plurality of first adjacent pixels P11, P12 and a pre-debanding color value corresponding to the color component of the to-be-compensated pixel P1.

The image debanding processing circuit 11 calculates a compensation value (hereinafter referred to as a first compensation value) according to the difference (hereinafter referred to as the first difference) between the original color value of the first comparison pixel and the original color value of the to-be-compensated pixel P1, the first pixel distance, and the preset pixel distance range (step S03), and calculate another compensation value (hereinafter referred to as a second compensation value) according to the difference (hereinafter referred to as the second difference) between the original color value of the second comparison pixel and the original color value of the to-be-compensated pixel P1, the second pixel distance, and the preset pixel distance range (step S04). The image debanding processing circuit 11 then calculates, according to the first compensation value, the second compensation value, and a random number (hereinafter referred to as a first random number), a color component value of the first color component of the to-be-compensated pixel P1 after the debanding (or called as a post-debanding component value of the first component of the to-be-compensated pixel P1) (step S05). Therefore, after the image debanding processing circuit 11 performs the debanding on the to-be-compensated pixel P1, the image debanding processing circuit 11 may perform the debanding on other to-be-compensated pixels of the input image signal S1, and then generate an output image signal S3 after performing the debanding on all to-be-compensated pixels.

Based on the foregoing, the image debanding processing circuit 11 calculates, according to the adjacent pixels P11 and P12 along the first straight pixel direction H1, the color component value of the first color component of the to-be-compensated pixel P1 centred on the to-be-compensated pixel P1. The image debanding processing circuit 11 does not need to perform an operation according to the original color value of each pixel of the input image signal S1, greatly reducing an amount of calculation of the debanding and the operation time of the debanding, and accordingly lowering complexity of the image debanding processing circuit 11, further reducing production costs of the image processing device 1.

Figure 4:
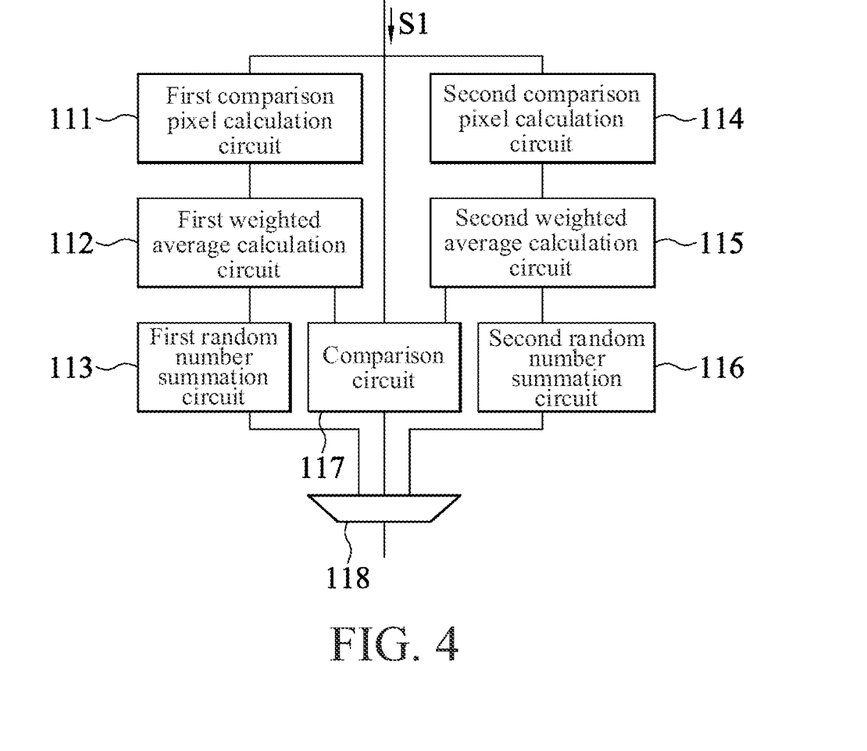
FIG. 4 is a circuit diagram according to an embodiment of the image debanding processing circuit of FIG. 1.

In some embodiments, as shown in FIG. 4, the image debanding processing circuit 11 includes a first comparison pixel calculation circuit 111, a first weighted average calculation circuit 112, and a first random number summing circuit 113. The first weighted average calculation circuit 112 is coupled between the first comparison pixel calculation circuit 111 and the first random number summing circuit 113.

Figure 5:
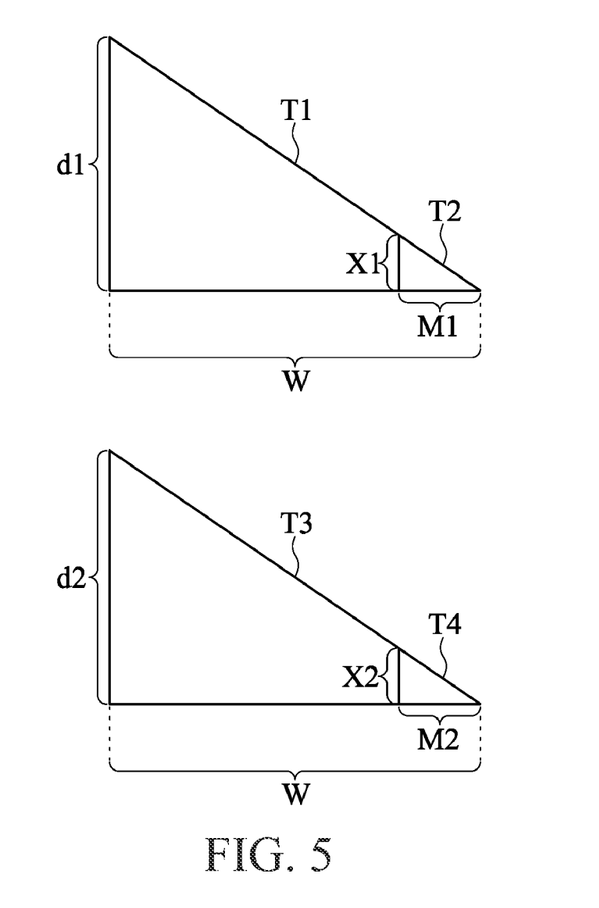
FIG. 5 is a schematic diagram according to an embodiment of a compensation value calculation method in which a comparison pixel calculation circuit in FIG. 4 calculates a compensation value.

The first comparison pixel calculation circuit 111 may perform steps S01 and S02 according to the foregoing preset difference after receiving the input image signal S1, to calculate the first comparison pixel and the second comparison pixel. Next, in step S03, the first comparison pixel calculation circuit 111 may calculate the foregoing first compensation value according to the triangle similarity theorem. In particular, referring to FIG. 5, two triangles T1 and T2 are illustrated in FIG. 5, and the triangles T1 and T2 are two similar triangles. In some embodiments, a value of a bottom edge of the triangle T1 and a value of a height of the triangle T1 are the foregoing preset pixel distance range and the first difference respectively, and a value of a bottom edge of the triangle T2 and a value of a height of the triangle T2 are the foregoing first pixel distance and the first compensation value respectively. Therefore, the first comparison pixel calculation circuit 111 may calculate the first compensation value according to the triangle similarity theorem by using a formula 1.1. The first compensation value calculated by the first comparison pixel calculation circuit 111 may include a decimal.

$$X1 = d1 * \left(\frac{M1}{W}\right), \qquad \text{formula 1.1}$$

X1 representing the first compensation value, d1 representing the first difference, M1 representing the first pixel distance, and W representing the preset pixel distance range.

Similarly, in step S04, the first comparison pixel calculation circuit 111 may further calculate the foregoing second compensation value according to the triangle similarity theorem. As shown in FIG. 5, the triangles T3 and T4 are two similar triangles. In some embodiments, a value of a bottom edge of the triangle T3 and a value of a height of the triangle T3 are the preset pixel distance range and the second difference respectively. A value of a bottom edge of the triangle T4 and a value of a height of the triangle T4 are the second pixel distance and the second compensation value respectively. Therefore, the first comparison pixel calculation circuit 111 may calculate the second compensation value according to the triangle similarity theorem by using a formula 1.2. The second compensation value calculated by the first comparison pixel calculation circuit 111 may include a decimal.

$$X2 = d2 * \left(\frac{M2}{W}\right), \qquad \text{formula 1.2}$$

X2 representing the second compensation value, d2 representing the second difference, and M2 representing the second pixel distance.

Figure 6A:
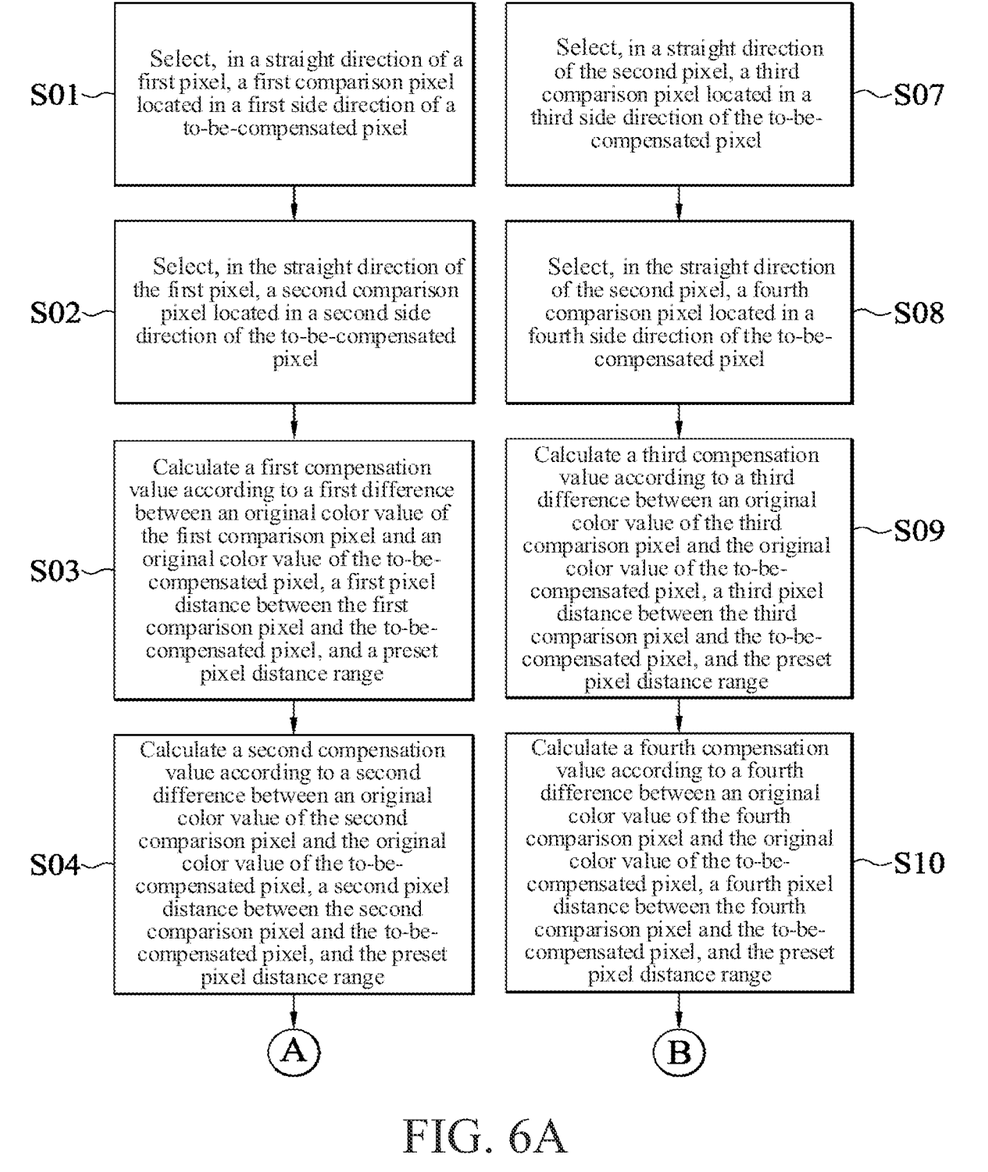
FIG. 6A is a flowchart according to an embodiment of the image debanding method in FIG. 3.
Figure 6B:
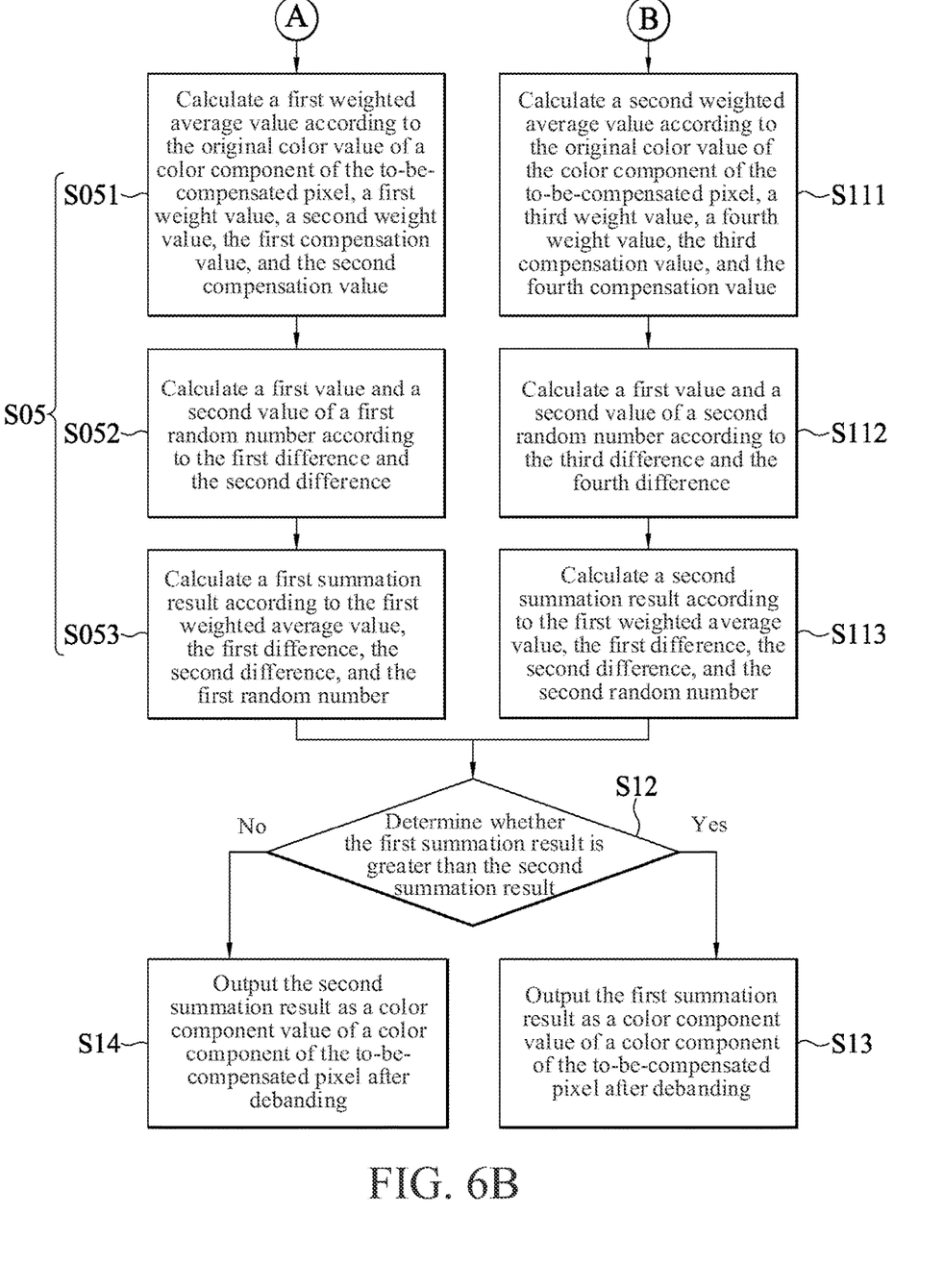
FIG. 6B is a flowchart following an embodiment of the image debanding method in FIG. 6A.

In some embodiments, with references to FIG. 4, FIG. 6A, and FIG. 6B, in step S05, the first weighted average calculation circuit 112 may calculate a first weighted average value according to the original color value of the first color component of the to-be-compensated pixel P1, a first weight value, a first compensation value, a second weight value, and a second compensation value (step S051). The first weight value corresponds to the first pixel distance, and a larger first pixel distance can be linked to a smaller the first weight value. The second weight value corresponds to the second pixel distance, and a larger second pixel distance can be linked to a smaller second weight value. The first weighted average calculation circuit 112 may calculate the first weighted average value according to a formula 1.3 in step S051. The first weighted average value may include a decimal;

$$(wgt1*(X1+ori)+wgt2*(X2+ori))/(wgt1+wgt2) \qquad \text{formula 1.3,}$$

ori representing the original color value of the first color component of the to-be-compensated pixel P1, wgt1 representing the first weight value, and wgt2 representing the second weight value.

In addition, in step S05, the first random number summing circuit 113 generates a first value of a first random number within a first random number range corresponding to the first difference, and generates a second value of the first random number within a second random number range corresponding to the second difference (step S052). For example, the first random number range may be a range from $$-\frac{d1}{2} \text{ to } +\frac{d1}{2}.$$

The first random number summing circuit 113 may randomly generate a value within the first random number range as the first value of the first random number. The first value of the first random number may include a decimal. The second random number range may be a range from $$-\frac{d2}{2} \text{ to } +\frac{d2}{2}.$$

The first random number summing circuit 113 may randomly generate a value within the second random number range as the second value. The second value of the first random number may include a decimal. In some embodiments, the first value and the second value of the first random number are equal, but the present invention is not limited thereto.

Next, the first random number summing circuit 113 then calculates, according to the first weighted average value, the first difference, the second difference, and the first value and the second value of the first random number, a post-debanding color component value of a first color component of the to-be-compensated pixel P1 (step S053). For example, the first random number summing circuit 113 may generate a summation result (hereinafter referred to as a first summation result) according to a formula 1.4, to calculate the color component value of the first color component of the to-be-compensated pixel P1 after debanding (or called as the post-debanding color component value of the first color component of the to-be-compensated pixel P1). The first random number summing circuit 113 may carry the first summation result to an integer bit including no decimal;

$$wm1+d1*RV11+d2*RV12 \qquad \text{formula 1.4,}$$

wm1 representing the first weighted average value, RV11 representing the first value of the first random number, and RV12 representing the second value of the first random number. If the first value and the second value of the first random number are equal, formula 1.4 may be simplified to wm1+(d1+d2)*RV11.

Figure 7:
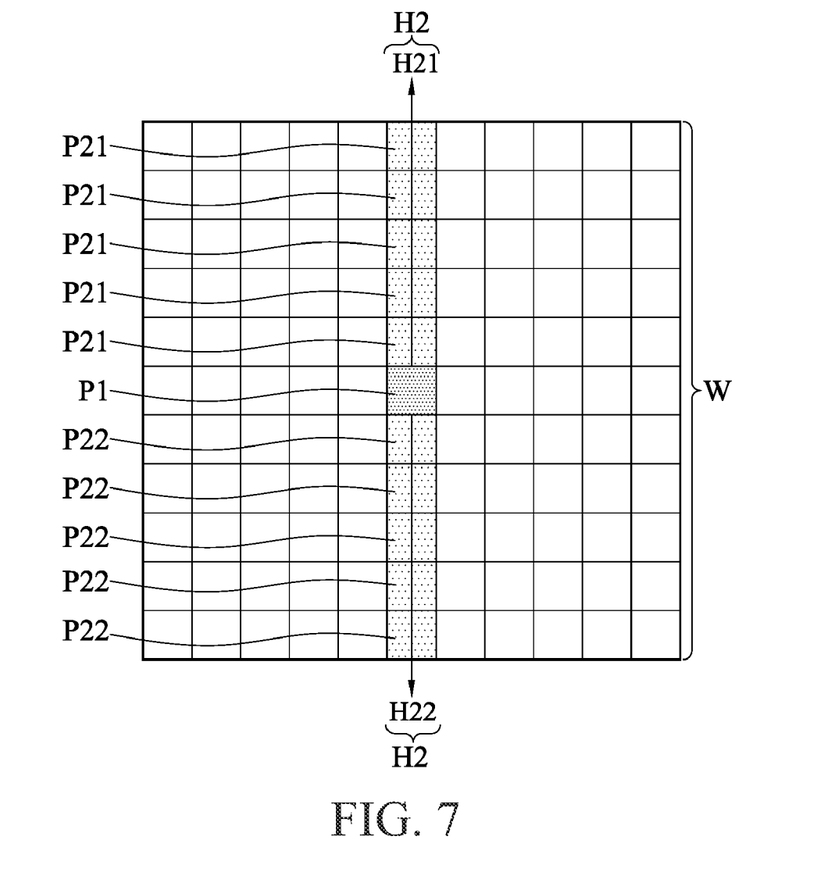
FIG. 7 is a schematic diagram according to another embodiment of an image debanding method by which the image debanding processing circuit in FIG. 1 performs.

In some embodiments, as shown in FIG. 7, the pixel P1 and a plurality of adjacent pixels P21, P22 (hereinafter referred to as second adjacent pixels P21, P22) of the pixel P1 are arranged along a second straight pixel direction H2. The second straight pixel direction H2 may be perpendicular to the first straight pixel direction H1. The second adjacent pixels P21 and P22 are pixels centred on the pixel P1 in a preset pixel distance range along the second straight pixel direction H2. In addition, in the straight direction H2 relative to both sides of the pixel P1, the straight direction H2 includes a third side direction H21 and a fourth side direction H22. The third side direction H21 is the direction passing through the second adjacent pixel P21 within the preset pixel distance range. The fourth side direction H22 is the direction passing through the second adjacent pixel P22 within the preset pixel distance range. When the image debanding determining circuit 10 determines that a first color component of the to-be-compensated pixel P1 requires to be debanded, the image debanding processing circuit 11 may further calculate the other two compensation values (hereinafter referred to as a third compensation value and a fourth compensation value) according to original color values (a value before debanding) of the first color components of the second adjacent pixels P21 and P22, and further determine, according to the third compensation value and the fourth compensation value, a way to calculate a color component value of the first color component of the to-be-compensated P1 after debanding. That is, the image debanding processing circuit 11 further considers the second adjacent pixels P21 and P22 in the other direction (i.e., the second straight pixel direction H2) so that a debanding effect of the input image signal S1 may be further improved.

In particular, with reference to FIG. 4, FIG. 6A, and FIG. 6B, the image debanding processing circuit 11 further includes a second comparison pixel calculation circuit 114, a second weighted average calculation circuit 115, and a second random number summing circuit 116. The second weighted average calculation circuit 115 is coupled between the second comparison pixel calculation circuit 114 and the second random number summing circuit 116. When the image debanding determining circuit 10 determines that the first color component of the to-be-compensated pixel P1 requires to be debanded, the second comparison pixel calculation circuit 114 calculates a difference between the original color value of the to-be-compensated pixel P1 and an original color value of the each of second adjacent pixels P21, and determines whether the difference is lower than the foregoing preset difference. When the difference between the original color value of one of the second adjacent pixels P21 and the to-be-compensated pixel P1 is lower than the preset difference, the second comparison pixel calculation circuit 114 selects the one of the second adjacent pixels P21 as a third comparison pixel (step S07). For example, the second comparison pixel calculation circuit 114 may determine the second adjacent pixel P21 that is one pixel away from the to-be-compensated pixel P1 as the third comparison pixel.

In addition, the second comparison pixel calculation circuit 114 calculates a difference between the original color value of the first color component of the to-be-compensated pixel P1 and an original color value of each of the second adjacent pixels P22 and determines whether the difference is lower than the foregoing preset difference. When a difference between the original color value of the to-be-compensated pixel P1 and an original color value of one of the second adjacent pixels P22 is less than the preset difference, the second comparison pixel calculation circuit 114 selects the one of the second adjacent pixels P22 as a fourth comparison pixel (step S08). For example, the second comparison pixel calculation circuit 114 may determine a second adjacent pixel P22 that is four pixels away from the to-be-compensated pixel P1 as the fourth comparison pixel. In short, the third comparison pixel and the fourth comparison pixel are selected according to the pre-debanding color value corresponding to the color component of each of the plurality of second adjacent pixels P21, P22 and the pre-debanding color value corresponding to the color component of the to-be-compensated pixel P1.

After the third comparison pixel and the fourth comparison pixel are determined, the second weighted average calculation circuit 115 calculates a pixel distance (hereinafter referred to as a third pixel distance) between the third comparison pixel and the to-be-compensated pixel P1, and the second weighted average calculation circuit 115 calculates a pixel distance (hereinafter referred to as a fourth pixel distance) between the fourth comparison pixel and the to-be-compensated pixel P1. The second weighted average calculation circuit 115 calculates a third compensation value according to the difference (hereinafter referred to as a third difference) between the original color value of the third comparison pixel and the original color value of the to-be-compensated pixel P1, the third pixel distance, and the preset pixel distance range (step S09), and the second weighted average calculation circuit 115 may calculate the third compensation value according to the triangle similarity theorem (similar to a calculation method of X1 and X2 shown in the embodiment of FIG. 5) by using a formula 1.5 in step S09;

$$X3 = d3 * \left(\frac{M3}{W}\right), \qquad \text{formula 1.5}$$

X3 representing the third compensation value, d3 representing the third difference, and M3 representing the third pixel distance.

Similarly, the second weighted average calculation circuit 115 calculates a fourth compensation value according to the difference (hereinafter referred to as the fourth difference) between the original color value of the fourth comparison pixel and the original color value of the to-be-compensated pixel P1, the fourth pixel distance, and the preset pixel distance range (step S10). The second weighted average calculation circuit 115 may calculate the fourth compensation value according to the triangle similarity theorem (similar to the calculation method of X1 and X2 shown in the embodiment of FIG. 5) by using a formula 1.6 in step S10.

$$X4 = d4 * \left(\frac{M4}{W}\right), \qquad \text{formula 1.6}$$

X4 representing the fourth compensation value, d4 representing the fourth difference, and M4 representing the fourth pixel distance.

Next, the second weighted average calculation circuit 115 calculates another weighted average value (hereinafter referred to as the second weighted average value) according to the original color value of the first color component of the to-be-compensated pixel P1, the third weight value, the third compensation value, the fourth weight value, and the fourth compensation value (step S111). The third weight value corresponds to the third pixel distance, and a larger third pixel distance can be linked to a smaller third weight value. The fourth weight value corresponds to the fourth pixel distance and a larger fourth pixel distance can be linked to a smaller fourth weight value. The second weighted average calculation circuit 115 may calculate a second weighted average value according to a formula 1.7 in step S111. The second weighted average value may include a decimal;

$$(wgt3*(X3+ori)+wgt4*(X4+ori))/(wgt3+wgt4) \qquad \text{formula 1.7,}$$

wgt3 representing the third weight value, and wgt4 representing the fourth weight value.

In addition, the second random number summing circuit 116 generates a first value of the second random number according to a third random number range corresponding to the third difference, and generates a second value of the second random number according to a fourth random number range corresponding to the fourth difference (step S112). For example, the third random number range may be a range from $$-\frac{d3}{2} \text{ to } +\frac{d3}{2}.$$

The second random number summing circuit 116 may randomly generate a value as the first value of the second random number by selecting from the third random number range. The first value of the second random number may include a decimal. The fourth random number range may be a range from $$-\frac{d4}{2} \text{ to } +\frac{d4}{2}.$$

The second random number summing circuit 116 may randomly generate a value as the second value of the second random number by selecting from the fourth random number range. The second value of the second random number may include a decimal. In some embodiments, the first value and the second value of the second random number are equal, but the present invention is not limited thereto.

The second random number summing circuit 116 then calculates a second summation result according to the second weighted average value, the third difference, the fourth difference, and the first value and the second value of and the second random number (step S113). The second random number summing circuit 116 may calculate the second summation result according to a formula 1.8 in step S113, and the second random number summing circuit 116 may carry the second summation result to an integer bit including no decimal;

wm2+d3*RV21+d4*RV22     formula 1.8, wm2 representing the second weighted average value, RV21 representing the first value of the second random number, and RV22 representing the second value of the second random number. If the first value and the second value of the second random number are equal, the formula 1.8 may be simplified to wm2+(d3+d4)*RV21.

After the first random number summing circuit 113 and the second random number summing circuit 116 calculates the first summation result and the second summation result respectively, the image debanding processing circuit 11 calculates a difference between a value in the first summation result and the original color value of the to-be-compensated pixel P1 and a difference between a value in the second summation result and the original color value of the to-be-compensated pixel and determine one of the summation result with a greater difference to be a color component value of the first color component of the to-be-compensated pixel P1 after debanding. As shown in FIG. 4, the image debanding processing circuit 11 further includes a comparison circuit 117 and a selection circuit 118. The comparison circuit 117 is coupled to the first random number summing circuit 113, the second random number summing circuit 116, and the selection circuit 118. The selection circuit 118 is controlled by the comparison circuit 117 and is coupled to the first random number summing circuit 113 and the second random number summing circuit 116. The comparison circuit 117 and the selection circuit 118 receive the first summation result generated by the first random number summing circuit 113 and the second summation result generated by the second random number summing circuit 116. The comparison circuit 117 compares the first summation result and the second summation result to determine whether the difference between the first summation result and the original color value of the to-be-compensated pixel P1 is greater than the difference between the second summation result and the original color value of the to-be-compensated pixel P1 (step S12). When the comparison circuit 117 determines that the difference between the first summation result and the original color value of the to-be-compensated pixel P1 is greater than the difference between the second summation result and the original color value of the to-be-compensated pixel P1 (a determining result shows "Yes"), the comparison circuit 117 outputs a comparison result to control the selection circuit 118 to output the first summation result as the color component value of the first color component of the to-be-compensated pixel P1 (step S13) after debanding, to complete debanding of the to-be-compensated pixel P1. When the comparison circuit 117 determines that the second summation result is greater than the first summation result (the determining result shows "No"), the comparison circuit 117 outputs the comparison result to control the selection circuit 118 to output the second summation result as the color component value of the first color component of the to-be-compensated pixel P1 after debanding (step S14), to complete debanding of the to-be-compensated pixel P1.

In should be understood that in the foregoing embodiment, the first comparison pixel, the second comparison pixel, the third comparison pixel, and the fourth comparison pixel are determined according to the same preset difference, but the present invention is not limited thereto. In some embodiments, the image debanding processing circuit 11 may determine the first comparison pixel, the second comparison pixel, the third comparison pixel, and the fourth comparison pixel respectively according to wholly or partially different preset differences in a first side direction H11, a second side direction H12, a third side direction H21, and a fourth side direction H22.

It should be understood that in the foregoing embodiment, the first color component is used as an example, but the present invention does not limit a number thereof. In some embodiments, the image debanding method in the present invention may be repeatedly implemented on a plurality of color components of the pixel P1 (for example: R, G, and B, but the present invention is not limited thereto).

It should be understood that in the foregoing embodiment, the pixel P1 is used as an example, but the present invention does not limit a number thereof. In some embodiments, the image debanding method of the present invention may be repeatedly implemented on a plurality of pixels in the image block or all image blocks of the input image signal S1. In some embodiments, when the image debanding method in the present invention is repeatedly implemented on a plurality of pixels, the image debanding determining circuit 10 and the image debanding processing circuit 11 perform calculation according to original color values of the plurality of pixels rather than a value after debanding.

In some embodiments, the image debanding processing circuit 11 may be implemented by an application specific integrated circuit (ASIC).

Based on the foregoing, according to an embodiment of the image debanding method of the present invention, the image debanding processing circuit 11 calculates, according to the adjacent pixel in the preset pixel distance range, the compensation value of the first color component of the to-be-compensated pixel P1 centered on the to-be-compensated pixel P1, and the image debanding processing circuit 11 does not need to perform calculation according to a color component value of each pixel of the input image signal, greatly reducing the workload of debanding calculation, greatly reducing calculation time of debanding, accordingly lowering circuit complexity of the image debanding processing circuit 11, and further reducing production costs of the image processing device 1.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An image debanding method, comprising:
    selecting a first comparison pixel and a second comparison pixel from a plurality of first adjacent pixels being, within a preset pixel distance range from a to-be-compensated pixel, along a first straight pixel direction passing through the to-be-compensated pixel of an image signal, wherein the first comparison pixel is located in a first side direction with respect to the to-be-compensated pixel, the second comparison pixel is located in a second side direction with respect to the to-be-compensated pixel, and the first comparison pixel and the second comparison pixel are selected according to a pre-debanding color value corresponding to a color component of each of the plurality of first adjacent pixels and a pre-debanding color value corresponding to the color component of the to-be-compensated pixel;
    calculating a first compensation value according to a first difference between the pre-debanding color value of the first comparison pixel and the pre-debanding color value of the to-be-compensated pixel, a first pixel distance between the first comparison pixel and the to-be-compensated pixel, and the preset pixel distance range;
    calculating a second compensation value according to a second difference between the pre-debanding color value of the second comparison pixel and the pre-debanding color value of the to-be-compensated pixel, a second pixel distance between the second comparison pixel and the to-be-compensated pixel, and the preset pixel distance range; and
    calculating, according to the first compensation value, the second compensation value, and a first random number, a post-debanding color component value corresponding to the color component of the to-be-compensated pixel.

2. The image debanding method according to claim 1, wherein the step of calculating the first comparison pixel and the second comparison pixel comprises:
    determining whether a difference between the pre-debanding color value of each of the first adjacent pixel in the first side direction and the pre-debanding color value of the to-be-compensated pixel is lower than a preset difference, the preset difference being not zero, and selecting the first comparison pixel from the first adjacent pixels in the first side direction; and
    determining whether a difference between the pre-debanding color value of each of the first adjacent pixel in the second side direction and the pre-debanding color value of the to-be-compensated pixel is lower than the preset difference, and calculating the second comparison pixel from the first adjacent pixels in the second side direction.

3. The image debanding method according to claim 1, wherein the step of calculating the post-debanding color component value corresponding to the color component of the to-be-compensated pixel comprises:
    calculating a first weighted average value according to the pre-debanding color value corresponding to the color component of the to-be-compensated pixel, a first weight value, the first compensation value, a second weight value, and the second compensation value, wherein the first weight value corresponds to the first pixel distance, and the second weight value corresponds to the second pixel distance;
    randomly generating a first value of the first random number according to the first difference;
    randomly generating a second value of the first random number according to the second difference; and
    calculating a first summation result according to the first weighted average value, the first difference, the second difference, and the first value and the second value of the first random number to calculate the post-debanding color component value corresponding to the color component of the to-be-compensated pixel.

4. The image debanding method according to claim 3, wherein the step of calculating the first compensation value comprises:
    using a formula in the form of $$X1 = d1 * \left(\frac{M1}{W}\right),$$

X1 representing the first compensation value, d1 representing the first difference, M1 representing the first pixel distance, and W representing the preset pixel distance range; and
    the step of calculating the second compensation value comprises:
    using a formula in the form of $$X2 = d2 * \left(\frac{M2}{W}\right),$$

X2 representing the second compensation value, d2 representing the second difference, and M2 representing the second pixel distance.

5. The image debanding method according to claim 4, wherein the step of calculating the first weighted average value comprises:
    using a formula in the form of (wgt1*(X1+ori)+wgt2*(X2+ori))/(wgt1+wgt2), wgt1 representing the first weight value, wgt2 representing the second weight value, and ori representing the pre-debanding color value corresponding to the color component of the to-be-compensated pixel.

6. The image debanding method according to claim 5, wherein the first weighted average value, the first compensation value, the second compensation value, and the first value and the second value of the first random number comprise decimals.

7. The image debanding method according to claim 4, wherein the step of calculating the first summation result comprises:
    using a formula in the form of wm1+d1*RV11+d2*RV12, wm1 representing the first weighted average value, RV11 representing the first value of the first random number, and RV12 representing the second value of the first random number.

8. The image debanding method according to claim 4, wherein the step of randomly generating the first value of the first random number according to the first difference is randomly selecting a value as the first value of the first random number in a range from $$-\frac{d1}{2} \text{ to } +\frac{d1}{2};$$

and the step of randomly generating the second value of the first random number according to the second difference is randomly selecting a value as the second value of the first random number in a range from $$-\frac{d2}{2} \text{ to } +\frac{d2}{2}.$$

9. The image debanding method according to claim 3, further comprising:
selecting a third comparison pixel and a fourth comparison pixel from a plurality of second adjacent pixels being, within the preset pixel distance range from the t-be-compensated pixel, along a second straight pixel direction passing through the to-be-compensated pixel, wherein the third comparison pixel is located in a third side direction with respect to the to-be-compensated pixel, the fourth comparison pixel is located in a fourth side direction with respect to the to-be-compensated pixel, and the third comparison pixel and the fourth comparison pixel are selected according to a pre-debanding color value corresponding to the color component of each of the plurality of second adjacent pixels and the pre-debanding color value corresponding to the color component of the to-be-compensated pixel;
calculating a third compensation value according to a third difference between the pre-debanding color value of the third comparison pixel and the pre-debanding color value of the to-be-compensated pixel, a third pixel distance between the third comparison pixel and the to-be-compensated pixel, and the preset pixel distance range;
calculating a fourth compensation value according to a fourth difference between the pre-debanding color value of the fourth comparison pixel and the original color value of the to-be-compensated pixel, a fourth pixel distance between the fourth comparison pixel and the to-be-compensated pixel, and the preset pixel distance range; and
calculating, according to the third compensation value, the fourth compensation value, and a second random number, a post-debanding color component value corresponding to the color component of the to-be-compensated pixel.

10. The image debanding method according to claim 9, wherein the step of calculating the third comparison pixel and the fourth comparison pixel comprises:
determining whether a difference between the pre-debanding color value of each of the second adjacent pixels in the third side direction and the pre-debanding color value of the to-be-compensated pixel is lower than the preset difference, and calculating the third comparison pixel from each of the second adjacent pixels in the third side direction; and
determining whether a difference between the pre-debanding color value of each of the second adjacent pixels in the fourth side direction and the pre-debanding color value of the to-be-compensated pixel is lower than the preset difference, and calculating the fourth comparison pixel from each of second adjacent pixels in the fourth side direction.

11. The image debanding method according to claim 9, wherein the step of calculating, according to the third compensation value, the fourth compensation value, and the second random number, the post-debanding color component value corresponding to the color component of the to-be-compensated pixel comprises:
calculating a second weighted average value according to the pre-debanding color value corresponding to the color component of the to-be-compensated pixel, a third weight value, the third compensation value, a fourth weight value, and the fourth compensation value, wherein the third weight value corresponds to the third pixel distance, and the fourth weight value corresponds to the fourth pixel distance;
randomly generating a first value of the second random number according to the third difference;
randomly generating a second value of the second random number according to the fourth difference; and
calculating a second summation result according to the second weighted average value, the third difference, the fourth difference, and the first value and the second value of the second random number to calculate the post-debanding color component value corresponding to the color component of the to-be-compensated pixel.

12. The image debanding method according to claim 9, wherein the step of calculating the third compensation value comprises:
using a formula in the form of $$X3 = d3 * \left(\frac{M3}{W}\right),$$

X3 representing the third compensation value, d3 representing the third difference, M3 representing the third pixel distance, and W representing the preset pixel distance range; and
the step of calculating the fourth compensation value comprises:
using a formula in the form of $$X4 = d4 * \left(\frac{M4}{W}\right),$$

X4 representing the fourth compensation value, d4 representing the fourth difference, and M4 representing the fourth pixel distance.

13. The image debanding method according to claim 12, wherein the step of calculating a second weighted average value comprises:
using a formula in the form of (wgt3*(X3+ori)+wgt4*(X4+ori))/(wgt3+wgt4), wgt3 representing the third weight value, wgt4 representing the fourth weight value, and ori representing the pre-debanding color value corresponding to the color component of the to-be-compensated pixel.

14. The image debanding method according to claim 13, wherein the second weighted average value, the third compensation value, the fourth compensation value, and the first value and the second value of the second random number comprise decimals.

15. The image debanding method according to claim 12, wherein the step of calculating the second summation result comprises:

using a formula in the form of wm2+d3*RV21+d4*RV22, wm2 representing the second weighted average, RV21 representing the first value of the second random number, and RV22 representing the second value of the second random number.

16. The image debanding method according to claim 12, wherein the step of randomly generating the first value of the second random number according to the third difference is randomly selecting a value as the first value of the second random number in a range from $$-\frac{d3}{2} \text{ to } +\frac{d3}{2};$$

and the step of randomly generating the second value of the second random number according to the fourth difference is randomly selecting a value as the second value of the second random number in a range from $$-\frac{d4}{2} \text{ to } +\frac{d4}{2}.$$

17. The image debanding method according to claim 11, wherein the step of calculating the post-debanding color component value corresponding to the color component of the to-be-compensated pixel further comprises:

comparing the first summation result with the second summation result;

determining, as the first summation result, the post-debanding color component value corresponding to the color component of to-be-compensated pixel when a difference between the first summation result and the pre-debanding color value of the color component is greater than a difference between the second summation result and the pre-debanding color value of the color component; and determining, as the second summation result, the post-debanding color component value corresponding to the color component of the to-be-compensated pixel when the difference between the second summation result and the pre-debanding color value of the color component is greater than the difference between the first summation result and the pre-debanding color value of the color component.

18. The image debanding method according to claim 7, wherein the first weighted average value, the first compensation value, the second compensation value, and the first value and the second value of the first random number comprise decimals, and the step of calculating the first summation result further comprises: carrying the first summation result to an integer digit.

19. The image debanding method according to claim 15, wherein the second weighted average value, the third compensation value, the fourth compensation value, and the first value and the second value of the second random number comprise decimals, and the step of calculating the second summation result further comprises: carrying the second summation result to an integer digit.

20. The image debanding method according to claim 9, wherein the first straight pixel direction is horizontal and the second straight pixel direction is perpendicular to the first straight pixel direction.

* * * * *